Jan. 20, 1948. S. EGGLESTON 2,434,760
CONVEYOR
Filed Feb. 12, 1945 2 Sheets-Sheet 2

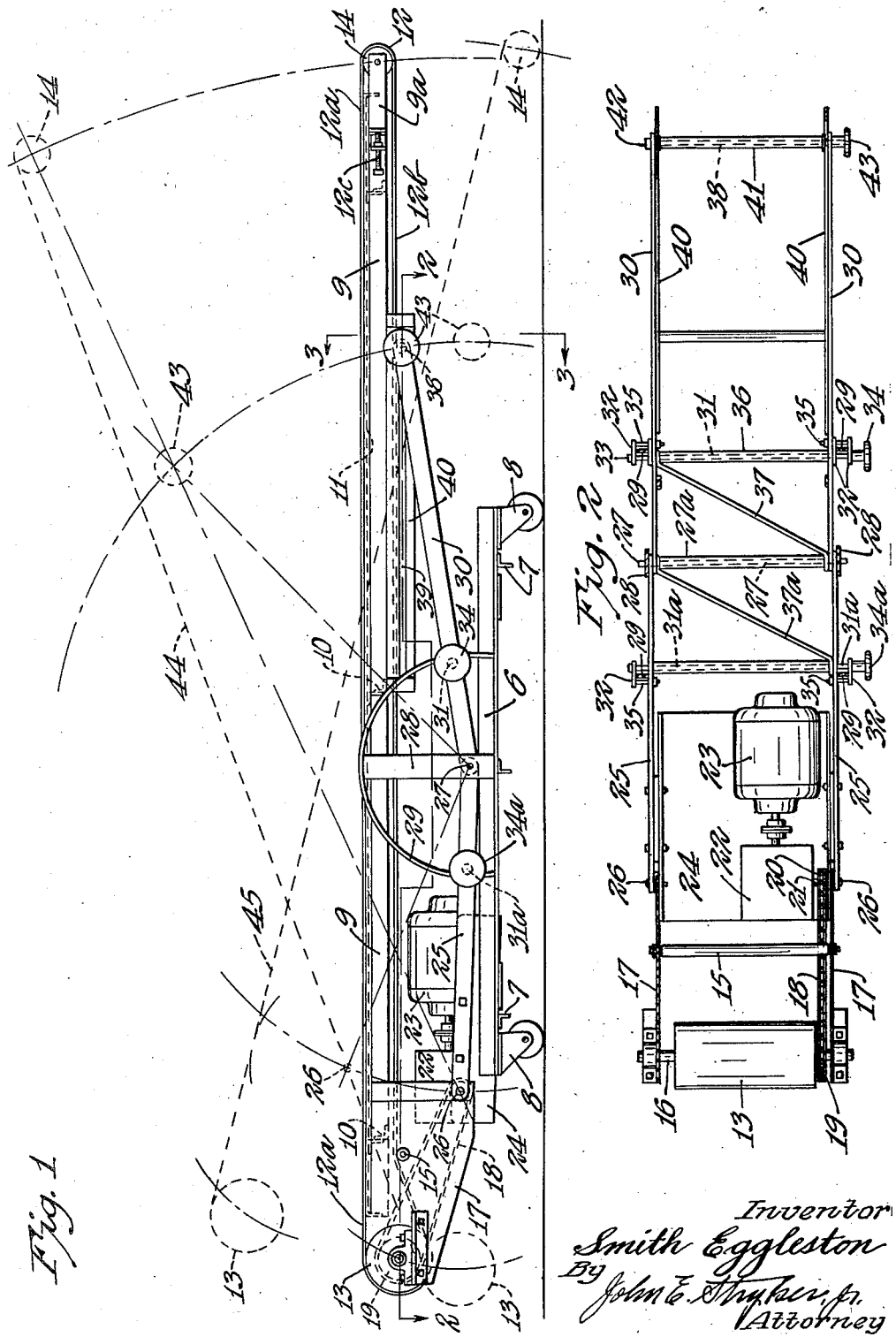

Inventor
Smith Eggleston
By John E. Stryker, Jr.
Attorney

Patented Jan. 20, 1948

2,434,760

UNITED STATES PATENT OFFICE 2,434,760

CONVEYOR

Smith Eggleston, St. Paul, Minn., assignor to Standard Conveyor Company, North St. Paul, Minn., a corporation of Minnesota Application February 12, 1945, Serial No. 577,369

9 Claims. (Cl. 198—117)

1

This invention relates to a conveyor having mechanism for moving loads along a determined path and readily adjustable means for supporting said mechanism at various elevations and in various inclined positions.

An object of the invention is to provide a compact and readily portable conveyor of this kind.

Another object is to provide novel and improved means for supporting the conveying structure at various elevations and in various inclined positions.

The invention also includes certain novel features of construction which minimize the work required to make changes in the elevation and incline of the load conveying structure.

Referring to the accompanying drawings:

Figure 1 is a side elevational view showing in full lines one embodiment of my invention with the adjustable supporting members in one of their many operative positions, other selected positions being indicated in broken lines;

Fig. 2 is a horizontal section taken approximately on the line 2—2 of Fig. 1;

Figure 3:
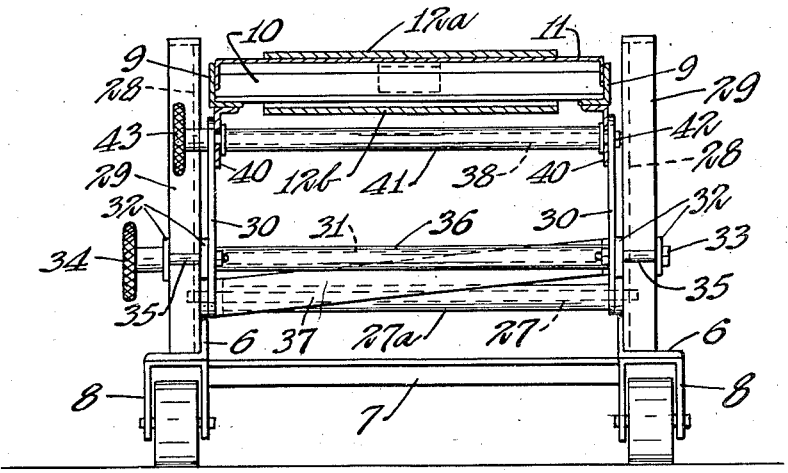
Fig. 3 is a vertical section taken on the line 3—3 of Fig. 1.

As shown in the drawings, I provide a conveyor with a base consisting of longitudinally extending frame members 6 connected by cross members 7 and having supporting casters 8 to facilitate movement of the structure to various locations where it is to be used. An elongated load carrying structure is mounted above the base and comprises a pair of rails 9 rigidly connected together at suitable intervals by cross members 10 and a deck 11 supported on and rigidly fastened to the rails and cross members 10. This deck has a polished upper surface adapted to slidably support the upper reach 12a of an endless conveyor belt 12 arranged so that its lower, return reach 12b passes beneath the deck. The belt 12 is trained on a drum 13 mounted near one end of the supporting frame and on a roller 14 mounted near the opposite end of the frame. A smaller guide roller 15 is also provided to support the lower reach 12b near the drum 13. Mechanism for maintaining the belt 12 under proper tension is provided. As shown in Fig. 1, the tightener comprises movable end portions 9a of the rails 9 supporting the roller 14 and screw threaded members 12c mounted on the respective rails and arranged to actuate the members 9a to retain the belt under tension.

2

This and other suitable belt tightening mechanisms are well known in the art and form no part of the present invention.

A shaft 16 supports the drum 13 and is journaled in bearings mounted on side plates 17. Provision is made for driving the drum and shaft 16 to which it is keyed through a chain 18 and sprocket wheels 19 and 20 fixed respectively on the shaft 16 and on a driving shaft 21. The latter shaft projects horizontally from a housing 22 containing speed reduction gearing which is driven in turn from the shaft of an electric motor 23. This motor is preferably of the reversible type so that loads may be carried in either direction along the deck 11.

A hanger 24 is rigidly fastened along its opposite margins respectively to arms 25 and the housing 22 and motor 23 are mounted on this hanger. Pivot pins 26 connect the arms 25 respectively to the plates 17 at opposite sides of the conveyor and these plates are severally fastened to the rails 9 respectively. To permit pivotal movement of the arms 25 relative to the plates 17 and rails 9, without affecting the driving connection between the shaft 21 and drum 13, the pivot pins 26 are disposed in axial alignment with the shaft 21.

Near their ends remote from the pivot pins 26 the arms 25 are pivotally connected to a horizontal shaft 27 which is supported on the base and has bearings in upright frame members 28. These frame members are fastened to the base members 6 and to arcuate guides 29 located at the respective sides of the base and extending in arcs which are coaxially disposed with respect to the pivot shaft 27. A second pair of arms 30 are arranged to support the right end portions of the rails 9 as seen in Fig. 1. These arms are pivoted on the shaft 27 and are maintained in spaced relation to each other at their lower ends by a sleeve 27a on the shaft 27.

Figure 4:
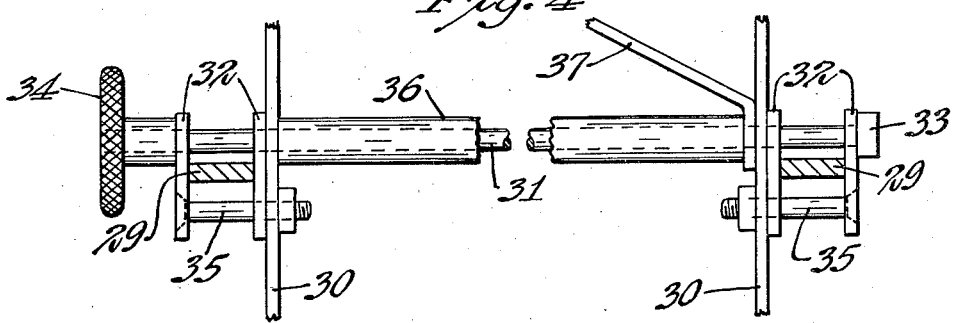
Fig. 4 is a horizontal section showing details of the mechanism for securing the inclined supports in various positions.

Each of the arms 30 is perforated to receive a horizontally extending rod 31 for securing these arms in various inclined positions. As shown in detail in Fig. 4, the arcuate guides 29 are confined at each side of the frame between a pair of clamp jaw members 32 which are perforated to receive the rod 31. Fixed on one end of the rod 31 is a head 33 to engage one of the clamp jaw members 32 and at its opposite end the rod 31 is fitted with a threaded nut for engagement with another of the members 32, this nut being integral with a manually operable knob 34.

The jaw members 32 and arm 30 at each side are perforated to receive a bolt 35 extending across the guide 29 near its face opposite the rod 31 for retaining these jaw members in parallel relation to each other and to the arms 30. To hold the arms 30 in properly spaced relation to each other, the rod 31 is fitted with a sleeve 36. One end of this sleeve abuts against the inner surface of an arm 30 and its other end confines an end of a brace 37 in contact with the other arm 25. With this arrangement of clamping mechanism it is only necessary to manipulate the knob 34 in order to release the arms 30 from one inclined position and to secure them in any other position within the limits determined by the guides 29.

The diagonal brace 37 extends from the sleeve 36 at one side of the frame to the end of the sleeve 27a at the opposite side, being perforated to receive the shafts 31 and 27. A similar brace 37a (Fig. 2) is provided for the arms 25. To connect the normally upper ends of the arms 30 to the rails 9, the arms are perforated to receive a horizontally extending clamp rod 38 and this rod is disposed to slide in elongated slots 39 formed in bars 40 mounted on the bottom surfaces of the rails 9 respectively (Figs. 1 and 3). A sleeve 41 is confined on the rod 38 between the bars 40 to afford abutments for the inner surfaces of these bars and one of the arms 30 is confined against the outer surface of one of the bars 40 by a head 42 (Figs. 2 and 3) which is fixed on one end of the rod 38. At its other end this rod is threaded to receive a nut having a manually operable knob 43. This nut may be tightened against the outer face of the adjacent arm 30 to secure the rod 38 and the adjoining ends of the arms 30 in any selected position within the range of movement permitted by the slots 39.

Provision is made for clamping the arms 25 to the arcuate guides 29 in various inclined positions. This clamping mechanism is similar to that for securing the arms 30 to the guides 29 and comprises a rod 31a having a threaded knob 34a at one end adapted to be manipulated, as in the case of the knob 34.

In operation, loads of a wide variety of types may be transported from one end of my improved conveyor to the other and either end may be used as the receiving end since the motor 23 is reversible to reverse the direction of movement of the upper reach of the belt. Typical inclined positions are indicated in broken lines in Fig. 1. For one of these positions the angle of the upper reach of the belt is indicated by the numeral 44 and that of another position by the numeral 45. Assuming that the conveyor is initially in the full line position shown in Fig. 1, in order to place and secure it in the inclined position indicated by the numeral 44, the clamping knobs 34 and 43 are loosened, then the right ends of the rails 9 are raised to the desired position and the knobs 34 and 43 are finally tightened. During the movement to this inclined position, the mechanism carried by the rails and plates 17 merely pivots about the pins 26 thus carrying the drum 13 to a slightly lower position as compared with the full line position shown.

When it is desired to raise both ends of the conveyor from the full line position the knobs 34, 34a and 43 are manipulated, as hereinafter more fully described, and then the arms 25 and 30 are oscillated upward about the common axis defined by the shaft 27. By tightening the several knobs 34, 34a and 43 the conveyor is held in the elevated or inclined position. The broken line 45 (Fig. 1) indicates the angle of the upper surface of the belt when the right end of the conveyor is depressed to substantially floor level and when the left end is elevated.

Adjustments of the elevation of the left end may be made with the knobs 34a and 43 in loosened position and with the knob 34 in tight or clamping position, the fastening being made by tightening the knob 34a while an end of the conveyor is supported manually, after which the operator merely releases his hold on the rails 9 or other convenient part and tightens the knob 43 to insure adequate support for the loads during the subsequent operation. During any adjustment the end of the conveyor being lifted or supported manually is counter-balanced at least in part by the weight of the opposite end beyond the pivot axis. It will thus be evident that the controls are so arranged that the operator is enabled to adjust the elevation of one end of the conveyor while the arms 25 or 30 supporting the other end are retained at a predetermined incline or fixed supporting position. Consequently the adjustments necessary to support the conveying elements in any of a multiplicity of operating positions may be made quickly and easily by a single operator.

The foregoing specific description is given by way of example and not to limit the scope of the present invention, as defined in the following claims. Obviously, my invention is not limited to a conveyor of the belt type, since it is well adapted for embodiment in a wide variety of other types of conveying mechanisms, including those employing a bed of freely rotating or power-driven rollers or of the chain and lug, or slat, bucket, rake or screw types.

Having described my invention, what I claim as new and desire to protect by Letters Patent is:

1. A conveyor comprising, mechanism for conveying loads along a determined path, a base, rigid elongated members pivotally connected at their lower ends to said base for oscillating movement independently of each other in substantially vertical planes, means connecting the upper end portions of said members respectively in supporting relation to opposite end portions of said mechanism, a rigid support projecting up from the base adjacent to each of said members intermediate its ends and means for securing said members to said supports respectively in various angular positions with respect to said base.

2. A conveyor comprising, mechanism for conveying loads along a determined path, a base, rigid members pivotally connected to said base and having a common axis of pivotal movement with respect thereto, the respective members being adapted to extend obliquely upward to support opposite end portions of said mechanism, a rigid support projecting up from the base adjacent to each of said members intermediate its ends and means for securing said members to said supports respectively in various inclined positions.

3. A conveyor comprising, rails, load conveying means carried by said rails for moving loads along a determined path, a base, members pivotally connected to said base and diverging obliquely upward therefrom to support opposite end portions of the rails, a rigid support projecting up from the base adjacent to each of said members intermediate its ends, clamps carried by said arms for securing said members to said supports respectively in various inclined positions and means connecting the upper end portions of said members to the rails.

4. A conveyor comprising, an elongated frame, load conveying means carried by said frame for moving loads along a determined path, a base, members pivotally connected to said base and diverging obliquely upward therefrom to support opposite end portions respectively of said frame, a rigid support rising from the base adjacent to each of said members intermediate its ends, means for securing said members to said supports respectively in various inclined positions, means pivotally connecting the upper end portion of one of said members to the frame and means for connecting the upper end portion of the other of said members to the frame in various positions along the same.

5. For a conveyor having mechanism for conveying loads along a determined path, a base, a pair of parallel arms pivotally connected to said base and extending obliquely upward to support an end portion of said mechanism and means for securing said arms in various inclined positions comprising, arcuate guides extending from said base adjacent to the respective arms, jaws carried by said arms for gripping engagement with the guides, a rod for simultaneously actuating said jaws and a manually operable nut threaded on an end of said rod for moving said jaws to clamping position.

6. In combination with mechanism for conveying loads along a determined path, a base, a pair of parallel arms pivotally connected to said base and extending obliquely upward to support an end portion of said mechanism, a second pair of parallel arms pivotally connected to said base and extending obliquely upward therefrom to support the opposite end portion of said mechanism, arcuate guides extending upward from said base adjacent to the several arms, jaws carried by the arms for gripping engagement with the several guides and manually operable means for actuating said jaws to secure the arms in selected positions with respect to the guides.

7. In combination with mechanism for conveying loads along a determined path, a base, a pair of parallel arms pivotally connected to said base and extending obliquely upward to support an end portion of said mechanism, a second pair of parallel arms pivotally connected to said base and extending obliquely upward therefrom to support the opposite end portion of said mechanism, the arms of both pairs having a common horizontal axis for oscillating movement above the base, guides extending upward from said base adjacent to the several arms, said guides having arcuate peripheries disposed concentrically to said axis, jaws carried by the arms for gripping engagement with the guides and manually operable means for actuating said jaws to secure the arms in selected positions with respect to the guides.

8. In combination with mechanism for conveying loads along a determined path, a base, a pair of parallel arms pivotally connected to said base and extending obliquely upward to support an end portion of said mechanism, means pivotally connecting the upper ends of said arms to said mechanism, a second pair of parallel arms pivotally connected to said base and extending obliquely upward therefrom to support the opposite end portion of said mechanism, guides for the upper ends of the arms of the second pair extending along said mechanism, means for securing the arms of the second pair in selected positions with respect to said guides, arcuate guides extending upward from said base adjacent to the several arms, jaws carried by the arms of both pairs for gripping engagement with said arcuate guides and manually operable means for actuating said jaws to secure the arms in selected inclined positions.

9. A conveyor structure comprising a frame, a continuous conveyor belt movable about said frame, means on said frame for moving said conveyor; a horizontal base, a first pair of arms hinged on said base on opposite sides thereof and engaged with said frame in a pivoted supporting relationship, a second pair of arms hinged on said base on a common hinge with first arms and on opposite sides of said base and engaged with said frame in a supporting relationship, and means for locking each arm pair in a desired position of adjustment, and comprising a pair of quadrants mounted on each side of said base cooperatively adjacent said arms, and means for locking said arms to at least one of said quadrants.

SMITH EGGLESTON.

REFERENCES CITED

The following references are of record in the file of this patent:

UNITED STATES PATENTS

| Number | Name | Date |
|---|---|---|
| 284,234 | Reeves | Sept. 4, 1883 |
| 389,538 | Baker | Sept. 18, 1888 |
| 956,816 | Mogg et al. | May 3, 1910 |
| 1,423,878 | Potter et al. | July 25, 1922 |
| 1,471,763 | Wentz | Oct. 23, 1923 |
| 1,808,237 | Liggett | June 2, 1931 |